United States Patent [19]

Nguyen et al.

[11] Patent Number: 4,482,656

[45] Date of Patent: Nov. 13, 1984

[54] METHOD FOR MANUFACTURING A COMPOSITION FOR COATING SUBSTRATES WITH AN ABRASION-RESISTANT TRANSPARENT AND TRANSLUCENT FILM

[75] Inventors: Van T. Nguyen, Cruseilles, France; Günter Bellmann, Commugny; Jean-Michel Armanet, Onex, both of Switzerland

[73] Assignee: Battelle Development Corporation, Columbus, Ohio

[21] Appl. No.: 537,215

[22] Filed: Sep. 29, 1983

[51] Int. Cl.³ .......................... C08K 3/10; C08K 3/36; C08K 9/06

[52] U.S. Cl. .................................... 523/212; 523/340; 428/447

[58] Field of Search ................. 523/212, 340; 428/447

[56] References Cited

U.S. PATENT DOCUMENTS

| | | | |
|---|---|---|---|
| 3,350,330 | 10/1967 | Cash et al. | 523/212 |
| 3,708,225 | 1/1973 | Misch et al. | 428/447 |
| 3,986,997 | 10/1976 | Clark | 524/766 |
| 4,026,826 | 3/1977 | Yoshida et al. | 428/447 |
| 4,177,315 | 12/1979 | Ubersay | 428/447 |
| 4,188,451 | 2/1980 | Humphrey | 428/447 |
| 4,343,857 | 8/1982 | Uram | 428/447 |
| 4,348,462 | 9/1982 | Chung | 524/868 |
| 4,382,109 | 3/1983 | Olson et al. | 524/203 |
| 4,418,165 | 11/1983 | Polmanteer et al. | 523/212 |

FOREIGN PATENT DOCUMENTS

| | | | |
|---|---|---|---|
| 531785 | 10/1956 | Canada | 523/212 |
| 5277154 | 6/1977 | Japan | 523/212 |
| 904548 | 8/1962 | United Kingdom | 523/212 |
| 1604405 | 12/1981 | United Kingdom | 523/212 |

OTHER PUBLICATIONS

Derwent Abst., 00787K/01, (JP57187347), 11–1982.
Derwent Abst., 83-703659/27, [C83-063677], RD-230034, Jun. 1983.
Derwent Abst., 39205D/22, (J56038472), 4–1981.
Derwent Abst., 80529E/38, (J57133129), 8–1982.
Derwent Abst., 91130Y/51, (J52134647), 11–1977.

Primary Examiner—Herbert J. Lilling
Attorney, Agent, or Firm—Benjamin Mieliulis

[57] ABSTRACT

Mineral charge particles of silica or alumina are grafted with a hydrolysis product from a di- or trialkoxysilane whose functional group is compatible with an organic phase into which said grafted particles are ultimately incorporated. The grafted particles are separated from the aqueous hydrolysis medium by spray-drying. The organic phase comprising the grafted mineral particles is used to provide coatings with abrasion resistant properties.

18 Claims, 3 Drawing Figures

METHOD FOR MANUFACTURING A COMPOSITION FOR COATING SUBSTRATES WITH AN ABRASION-RESISTANT TRANSPARENT AND TRANSLUCENT FILM

FIELD OF THE INVENTION

The present invention relates to scratch-resistant surfaces and more particularly concerns a method for making a polymerizable composition to be applied on substrates so as to produce thereon translucent or transparent coatings resisting corrosion and abrasion. Said coatings are intended to protect substrates against shocks, bruises and other mechanical accidents as well as against wear resulting from normal use. Such compositions are very useful in all industrial fields where it is desirable to avoid, as much as possible, progressive damage to sensitive objects of any kind exposed to shock and wear. This is particularly important when dealing with transparent articles such as optical goods the surface of which must be protected by all means against scratches so as not to lose their desirable optical properties.

It has been established in the art that the manufacture of high performance optical ware by using transparent organic materials and plastics is possible, the manufacture of which, by casting or any other machining means, is much easier and more economical than with corresponding articles of ordinary glasses from metal oxides. On the other hand, such articles of "organic glass" are relatively soft and poorly resist abrasion, wear and corrosion by external agents. Thus, it is desirable to cover such articles with an anti-abrasion and anti-corrosion protective film but thin enough so as not to significantly alter the optical properties of the substrate.

BACKGROUND OF THE INVENTION

Very many coating compositions and application methods have already been proposed for achieving the aforementioned protection, these meeting with varied success.

Among all the compositions of the prior art, some owe their properties to the presence of compounds from elements other than the usual constituents of organic matter and, in particular, to aluminum and silicon in the form of specific mineral or organic compounds. With reference to silicon, for instance, some of the techniques used involve the build-up of a protective coating on the substrate, this coating being obtained from the vapor phase deposition of glass or silica evaporated under vacuum. Polysiloxane based protective coatings can also be obtained, the structure of which resembles to some extent that of cross-linked polysilicic acid, by the in-situ polymerization of organo-silicon compounds previously partly hydrolyzed. During the hardening (curing) of such coatings, polymerization occurs, either due to the formation of Si—O—Si bridges (by the dehydration of silanol functions), or due to the participation of polymerizable organic groups belonging to substituents possibly present on the silicon atoms (olefins, epoxy-, amino-groups, etc.), or by a combination of the said two polymerization modes. From the references illustrating such techniques, the following can be cited: A. J. REEDY, Res. Discl. 1978, 171–6; Patents U.S. Pat. Nos. 4,006,271; 4,098,840; 4,186,026; 4,197,335; JP (Kokai) Nos. 77, 101,235; 112,698; 152,426; 154,837; Nos. 79 60,335; 62,267; 119,597; 119,599; 129,095 to 129,099; 133,600; 144,500; 148,100; Nos. 80, 05,924; and DOS Nos. 2,803,942; 2,805,552; 2,820,391; 2,831,220; 2,917,440.

Despite the protection they impart to the substrate on which they are applied, these coatings have drawbacks. One of such drawbacks or disadvantages is related to the relatively high temperatures needed for curing polysilicic type coatings which can lead to substrate deformation. Another drawback is related to the expansion coefficient of the polysiloxane coatings which is often sufficiently different from that of the substrate to cause the development of adhesion problems (for instance in the case of polycarbonate or polymethacrylate organic glasses) and of cracks or crazing after alternating hot and cold periods (particularly in the case of articles subjected to weathering like automobile headlights). Adhesion problems of this type were attempted to be solved by interposing an intermediate bonding sublayer between the coating and the substrate. More generally the above mentioned drawbacks have been attempted to be remedied by replacing the coatings of polymerized silicon compounds with compositions comprising, dispersed within an organic or silicon-organic matrix, fine particles of silica or alumina, specifically, the compositions relied upon have been aqueous mixtures of silicon compounds, colloidal silica and hydrocompatible solvents (alcohols, glycols, etc.), with or without polymerizable organic monomers. Examples of such uses can be found in the following references: Belgian Pat. Nos. 821,403; 877,372; U.S. Pat. Nos. 4,027,073; 4,188,451; 4,177,315; GB Nos. 2,018,621; 2,018,622; DOS No. 2,811,072 and JP (Kokai) No. 79, 157,187.

Colloidal silicas which are essentially hydrophilic (as are also the other types of silica such as amorphous, crystalline, microcrystalline, precipitated and pyrogenic silicas) are compatible in general, only with hydrophilic polymers. Such silicas are much less or not miscible with typical hydrophobic resins such as polyolefins, which very strongly restricts their use as a filler in film forming thermosetting or photo-setting compositions. Moreover, adding hydrophilic silica to organic polymerizable monomers leads to the formation, with relatively low concentrations of solids, e.g. about 5 to 10% by weight, of highly thixotropic masses (non-Newtonian rheologic behavior) which are very difficult to apply as thin layers on substrates. Hence, attempts were made to remedy this disadvantage, i.e. to increase the level of silica in organic resin coatings, while overcoming such application problems, by treating the particles so as to make them organophilic. One of the most promising methods for achieving such purposes, i.e. for imparting hydrophobic organophilic properties to alumina or silica particles sufficient to enable them to be incorporated at high levels (of about 10 to 40% by weight or more) into polymeric resin films, while maintaining suitable rheological properties for application and translucency or transparency of the films formed, consists in attaching suitable organo-compatible substituents to said particles. (The terms compatible and compatibility as used herein shall be understood to mean that the filler must be made compatible with the hydrophobic vehicle, i.e., it must be made oleophilic, highly dispersible without aggregation into the vehicle to form a finely divided dispersion either transparent or translucent depending on the degree of matching of refractive index, and capable of addition at high concentration without forming viscous or thixotropic solutions). The substituents must be selected so as to ensure proper transparency of the protective coatings without detracting from resistance to abrasion. As pertinent references regarding the methods for "treating" silica or alumina particles for rendering them organophilic, South African Pat. No. 72.5180 and Japanese Patent (Kokai) No. 77, 138,154 can be cited. In the first of these references, silica particles are treated with trimethylchlorosilane which, by reaction with the silanol groups of said particles, generates hydrophobic groups of formual whereby said particles are rendered compatible with a mixture of olefinic monomers (ethylenic and acrylic monomers). These particles are then incorporated, to a level of about 5–10% by weight and together with a proportion of alumina about 10 to 20 times greater, into a mixture of polymerizable resins which, after curing, provides insulators for high electric voltages. Such materials are however opaque and their resistance to abrasion is not indicated. In the second of the two references cited above, particles of alumina are coated with γ-(glycidyloxy)-propyl-trimethoxysilane and a mixture containing about 25% by weight of such treated alumina and an epoxy resin is used for coating a polycarbonate article so as to obtain, after polymerization, an abrasion-resistant film. Also, in the following references, there are described methods for attaching organic groups such as vinyl, methacryl, epoxy, glycidoxy to hydrophilic silica so as to impart thereto hydrophobic properties: L. P. ZIEMIANSKI et al, Rubber World 163, 1 (1970); M. W. RANEY et al, Meeting of the Div. of Rubber Chem., ACS Meeting, Cleveland, Ohio (1971); M. W. RANEY et al, Meeting of the Div. of Rubber Chem., ACS, Miami, Fla (1971); HI-SIL Bulletin 41, Jan. 1971, PPG Industries.

In addition to the above mentioned prior art, some further U.S. Patent references can be cited in connection with the following subjects related more or less closely to the invention:

1. $SiO_2$: U.S. Pat. Nos. 3,986,997; 4,177,315; 4,188,451; 4,242,403.

1A. Treated $SiO_2$, e.g. to make it hydrophobic: U.S. Pat. Nos. 2,610,167; 2,818,385; 3,652,379; 4,001,128.

2. Forming $SiO_2$ in situ, e.g. hydrolyzing organic silicates: U.S. Pat. Nos. 2,404,357; 2,404,426; 3,971,872; 4,049,868; 4,120,992; 4,186,026.

3. Using siloxanes and/or silanes and the like: U.S. Pat. Nos. 2,610,167; 3,389,114; 3,801,361; 3,953,115; 3,986,997; 4,001,128; 4,006,271; 4,026,826; 4,027,073; 4,029,842; 4,049,868; 4,177,315; 4,186,026; 4,188,451; 4,197,335; 4,242,403.

4. Combination of any of the above items with:

4A. Polymers: U.S. Pat. Nos. 2,404,357; 2,404,426; 2,610,167; 3,324,074; 3,328,339; 3,419,517; 3,652,379; 3,801,361; 3,971,872; 4,001,128; 4,026,826; 4,049,868; 4,098,840; 4,120,992; 4,197,335; 4,242,403.

4B. Prepolymers (oligomers or monomers) suitable as organic phases for abrasion-resistant films: U.S. Pat. Nos. 3,819,562; 4,029,842; 4,197,335.

4B1. Photopolymerizable monomers: U.S. Pat. Nos. 3,968,305; 3,968,309; 4,188,451

4C. Other chemicals, e.g. solvents, fillers, cross-linking agents, to obtain transparent abrasion-resistant coatings (as single or composite systems): U.S. Pat. Nos. 3,986,997 (acidic alcohol $H_2O$ solution); 4,001,128 ($Al_2O_3$); 4,006,271 (solvent); 4,027,073 (acidic alcohol water solution); 4,049,868; 4,186,026 and 4,120,992 (cross-links with formaldehyde); 4,120,992.

5. Miscellaneous routes to such coatings: thus U.S. Pat. No. 3,645,779 provides a vacuum vapor deposited coating of $B_2O_3$-$SiO_2$ on organic glass; U.S. Pat. No. 4,051,297 discloses a sputtered film of chromium silicide on smooth surfaces; in U.S. Pat. No. 4,242,403, there is disclosed a polyethylene terephthalate sheet covered with an intermediate layer of γ-(3,4-epoxycyclohexyl)-ethyltrimethoxysilane and an upper layer of silica reinforced organopolysiloxane resin.

In addition to the aforementioned prior art, in co-pending International Application No. PCT/EP82/00004, a composition was disclosed for providing thin translucent or transparent films very resistant to abrasion by virtue of a high level therein of hydrophobic silica. This composition comprises an organic phase consisting of one or more photopolymerizable monomers or prepolymers, at least one photoinitiator and charges of $SiO_2$ or $Al_2O_3$ particles having, grafted on some of the oxygen atoms thereof, silane or siloxane substituents. By means of said composition the following desirable objectives were achieved:

depositing of transparent protective films on substrates, such films being sufficiently mechanically resistant to withstand normal wear or accidental abuses without impairment of the surface properties; providing protective transparent film coatings on optical goods, the optical properties of which are not significantly modified and which keep such properties for a significant period of time under adverse conditions; depositing of thin well-adhering films on substrates, such adhesion not being affected by weathering conditions even after a prolonged period of exposure; providing film forming coatings that will strongly adhere to organic glass substrates and which can be cured at room temperature, i.e. much below the softening temperatures of the substrate; providing transparent scratch-resistant coatings applied on substrates as one layer films, i.e. without the need of an intermediate bonding layer; providing compositions stable enough for accepting prolonged storage periods at room temperature without hardening and nonetheless reactive enough to be cured on the substrates in a matter of seconds witnhout the use of elevated temperatures.

The fulfillment of these objects by the reference disclosure provided industrial optical articles made of relatively soft and easy moldable organic glasses protected with a scratch resistant film withstanding prolonged use under severe weathering conditions without discoloration, crazing or significant adhesion losses.

In one of the preferred methods of manufacturing the composition disclosed in PCT/EP82/00004 the mineral particles to be incorporated into the organic phase are rendered hydrophobic by reacting with trialkoxysilane compounds. In this method, the trialkoxysilane compounds are first dispersed into an aqueous medium (mainly a water phase) wherein they are converted to some extent by hydrolysis into corresponding hydroxysilane compounds. Upon subsequent addition of the mineral particles ($SiO_2$ or $Al_2O_3$) a condensation reaction between the hydroxy groups of the hydroxysilanes and that of the particles occurs with consequent attachment of said silane compounds onto the particles. This is essentially the generally accepted description of the grafting phenomenon involved in this reaction which leads to the production of hydrophobic graft mineral particles.

Then, the grafted charge must be separated from the aqueous reaction medium and dried to an extent sufficient to enable it to be subsequently incorporated into the organic phase of the composition while avoiding difficulties inherent to the presence of an excess of moisture. In the above referred work, this aim was achieved by centrifuging the aqueous dispersion of grafted particles in order to separate the heavier solids from the liquid, then by drying the separated solids in an oven and finally by grinding the dried solids in a mill to the desired mesh size, this last operation being intended to break the agglomerates of particles formed during the drying stage.

It was however found later that this separation and drying step has shortcomings. For instance, during centrifuging, all liquids including possible still ungrafted hydroxysiloxane are eliminated. This elimination is undesirable because of loss of reagent and overall decrease of the grafting yields. Also, during the drying stage in an oven, the heat developed there can possibly damage, at least in part, the organic substituents grafted on the particles or, in the case when such substituents carry reactive functions to be reacted later with monomers in the organic phase upon curing, such functions may prematurely react together and produce unwanted early cross-links between the substituents. These conditions change the rheological properties of the composition upon mixing of the grafted particles with the organic phase (high viscosity build-up at relatively low levels of mineral charge incorporation). Finally, the drying stage in an oven appears to be responsible for the formation of relatively large particle aggregates requiring the dried product to be ground for long periods before incorporation into the organic phase, a step which is economically undesirable. (The term "charge" as used throughout this application is used in the sense referring to material load or weight.)

The first drawback mentioned was cured by replacing the centrifuging step by an evaporative step (for instance in a conventional Rotavapor apparatus) of the aqueous grafting medium (under ordinary or reduced pressure), but this did not remove the agglomeration problems nor the problems associated with premature reaction since evaporation of large amounts of water requires prolonged heating periods even under relatively low pressures.

SUMMARY OF THE INVENTION

It has now been discovered by the present inventors that a most preferable route to remedy the aforementioned difficulties is to utilize a novel improved spray-dry process for the formation of abrasive resistant transparent coatings. Therefore, the present invention is defined as follows:

A method for manufacturing a polymerizable composition to be applied on substrates for providing thereon, after polymerization, a translucent or transparent abrasion and weather and solvent resistant coating, this composition containing essentially an organic phase consisting of one or more polymerizable monomers and/or prepolymers, one or more polymerization catalysts or initiators and a mineral charge or filler of finely divided silica or alumina carrying, grafted on the particles thereof, organophilic substituents whose presence achieves extensive compatibility between said organic and mineral charges, comprising the following steps:

(1) hydrolyzing a di- or trialkoxysilane of formula $$(RO)_{3-n}SiR^1R_n^2 \qquad (I)$$

in which R represents identical or different lower alkyls and $R^1$ and $R^2$ are identical or different organic substituents compatible with said organic phase, n being 0 or 1, said hydrolysis providing a corresponding di- or trihydroxy-silane of formula $$(HO)_{3-n}SiR^1R_n^2 \qquad (II)$$

in solution in the hydrolysis medium, (2) adding thereto a proportion of said mineral particles whereby compound II will react with said particles thus providing said grafted particles and homogenizing the mixture for providing a homogeneous dispersion of said grafted mineral charge in said medium, (3) spray-drying said homogeneous dispersion into a powdered substantially dry grafted mineral charge, and (4) incorporating by milling said dry grafted mineral charge into said organic phase.

Indeed it was found that, quite unexpectedly, the incorporation of the improvement defined in step (3) hereinabove procured the following advantages:

(a) Improved the yield of the grafting operation, i.e. increased the amount of organic matter attached to the mineral particles. (This increased yield is believed attributable to either direct covalent grafting or further polycondensation of unreacted silanol groups or, possibly, adsorption of non-covalently bonded homopolymerized polysiloxane chains on the structure of the particles.)

(b) Prevented the formation of undesirable premature cross-links between the grafted substituents carrying reactive functions, thus preserving the full potentiality of such functions for the time when the films obtained from the composition are cured, and provided advantageous rheological properties (reduced viscosity) to the composition for the application of thin films.

(c) Drastically reduced the formation of aggregates to be broken down before bringing about step (4) of the present method.

The various features in connection with steps (1) to (4) will now be discussed in reference to preferred embodiments of the invention.

PREFERRED EMBODIMENTS OF THE INVENTION

The groups defined by RO in formula I above can be lower alkoxy or cycloalkoxy groups such as methoxy, ethoxy, propoxy (n and iso), butoxy, pentoxy and the like. The groups defined by $R^1$ and $R^2$ can be extremely variable, the only requirements therefor being chemical availability, stability, reasonable cost and compatibility with the organic monomers and/or prepolymers involved in the composition. Among the many possible groups, the following can be recited non-limitatively: N-(β-aminoethyl)-β-aminoethyl; N-(β-aminoethyl)-γ-aminopropyl; N-(γ-aminopropyl)-γ-aminopropyl; N-(γ-aminopropyl)-β-aminoethyl; methyl; ethyl; propyl; butyl; pentyl; hexyl and other higher alkyl's; cyclopentyl; cyclohexyl; alkylated cycloalkyl; vinyl; β-acryloxyethyl; γ-acryloxypropyl; β-methacryloxyethyl; γ-methacryloxypropyl; β-glycidoxyehtyl; γ-glycidoxypropyl; β-glycidoxypropyl; and the like.

Typical silane compounds useful in the present invention are:
vinyltriethoxysilane
vinyl-tris(beta-methoxyethoxy)silane
gamma-methacryloxypropyltrimethoxysilane
beta-(3,4-epoxycyclohexyl)-ethyltrimethoxysilane
gamma-glycidoxypropyl-trimethoxysilane
gamma-aminopropyltriethoxysilane
N-beta-(aminoethyl)-gamma-aminopropyl-trimethoxysilane
gamma-ureidopropyl-triethoxysilane
gamma-chloropropyltrimethoxysilane
gamma-mercaptopropyl-trimethoxysilane
N-$\beta$-(N-vinylbenzyl-amino)ethyl-$\gamma$-aminopropyltrimethoxy-silane monohydrochloride
vinyltrimethoxysilane $CH_2$:$CHSi(OCH_3)_3$
vinyltriethoxysilane $CH_2$:$CHSi(OC_2H_5)_3$
vinyl-tris-($\beta$-methoxy-ethoxy)-silane $CH_2$:$CHSi(OC_2H_4OCH_3)_3$ The conditions under which step (1) can be performed are not critical provided that enough water is used to effect hydrolysis. Preferably, the alkoxysilane is added to water in concentration by weight of about 1 to 20% although higher concentrations, i.e. up to 50% by weight or lower concentrations are possible although less practical. Then, the two reagents are stirred together for a variable period (for instance from 15 minutes to 15 hours) at temperatures from about 10° C. to 50° C. Lower temperatures will unnecessarily prolong the reaction time while temperatures above 50° C. may be undesirable or even detrimental as being prone to favor premature autocondensation (prepolymerization into siloxane chains). Preferably, the hydrolysis is carried out using 1 to 10% by weight of the alkoxysilane in water and agitating for 15-30 minutes at room temperature. It should be noted that the resulting aqueous dispersion or solution of hydrolysis is quite stable at room temperature at least up to 24 hours in the case of a 2% solution which is a significant technical advantage since there is no need, after the end of step (1), to immediately perform step (2) of the present method. The pH of the aqueous medium when effecting the aforementioned hydrolysis is normally comprised between 3 and 5.5 for the $\gamma$-methacryloxypropyl derivative; a pH value of about 3.5-4 is preferred. For this pH control, any acid, mineral or organic, is suitable provided it has the required strength. In general, acetic acid is preferred. For other trialkoxysilanes the pH is desirably adapted to meet the requirements of the functional groups, e.g. the aminopropyl derivative is preferably hydrolyzed under mildly alkaline conditions (pH 8-9) and the epoxy derivative under neutral conditions.

The types of mineral particles to be used in step (2) include many varieties of $SiO_2$ and $Al_2O_3$. However, as pointed out in the reference application, the size of the particles is important with respect to the optical properties to be given to the ultimately obtained abrasion-resisting coating. Thus, using relatively large particles, i.e. with a diameter of several micrometers (um), may provide at the surface of the film microscopic prominences not visible with the eye but detrimental to the optical properties thereof (undesirable light reflection and diffraction effects). This may impart to the film a milky appearance. To be perfectly clear, the film should have a flawless, smooth, mirror-like surface. Consequently, one will preferably use particles of a size about one order of magnitude less than the coating thickness. Thus, for instance, with contemplated coatings having a thickness in the order of one micron or less, one will advantageously use particle sizes of 0.007 to 0.05 um [pyrogenic $SiO_2$: AEROSIL (Degussa, Germany), CAB-O-SIL (Cabot Corp. USA); precipitated silica: HI-SIL (PPG Industries, USA), etc.]. For thicker coatings, larger size particles are possible, for instance 0.02 to 0.1 um (precipitated silica). As suitable alumina for the present composition, the varieties designed by the names ALON (CABOT Corp.) and ALUMINA-C (DEGUSSA), the particles of which have a size approximately 0.01 um can be mentioned. Additional lists or examples of silicas useful in the method and process of the present invention is also given in PCT/EP82/00004, page 9.

The conditions under which the grafting of step (2) can be carried out are not critical either. The properties of the ultimately obtained product however depend on the dispersing ability of the equipment with which this step is performed, particularly regarding its ability to overcome the tendency of the particles to agglomerate during grafting or to break down by attrition the aggregates already formed. Suitable dispersing apparatus for this step are for instance homogenizers of types "PRESTO-MILL" (O. Krieger, Muttenz, Switzerland) or "HOMOREX" (BROGLI, Alschwil, Switzerland) and ULTRA TURRAX (KINEMATICA, Lucerne, Switzerland).

The ratio by weight of the mineral charge to the alkoxy silane subjected to step (1) can vary in step (2) between widely spread limits; however this ratio is usually kept between 1:1 and 10:1. In general, the higher the above ratio, the higher the viscosity of the composition after incorporating the grafted charge in step (4) (comparisons made on the basis of 20% by weight of grafted charge in 80% of an organic phase). However, although using low ratios of mineral charge to silane (i.e. mineral particles having a high level of grafted substituents) might seem an advantage to obtain low viscosity compositions (or to incorporate larger proportions of mineral charges for a given viscosity), this apparent advantage would in reality be offset by the higher cost of products containing larger quantities of expensive silanes.

In general, step (2) is carried out by adding the determined amount of charge to the aqueous dispersion or solution resulting from step (1) and homogenizing vigorously for about 15 minutes to 2 hours between 10° and 50° C., preferably for 30 minutes at room temperature. It is not advantageous to maintain the agitation over about 2 hours as, after that time, the mixture thickens and mixing becomes more difficult. Also, when the mineral charge has been subjected to a grafting step exceeding 2 hours, it imparts a high viscosity (still on the 20% by weight basis) to the composition after incorporation into the organic phase. It is therefore preferable to undertake step (3) (separation) as soon as possible after step (2) is terminated, i.e., as soon as the dispersion is homogeneous.

One important remark should however be made at this stage: if desired, steps (1) and (2) can actually be carried out practically simultaneously, i.e. the alkoxysilane can be added to the aqueous medium, then the mineral charge is added and both are homogeneously dispersed together for about 30-60 minutes at room temperature. The results are however not as favorable as with the standard stepwise procedure with regard to end properties.

As disclosed hereintofore, step (3) is carried out by subjecting the dispersion resulting from step (2) to spray-drying, i.e. the mixture is atomized in a current of hot air which results in the instantaneous removal of water and deposition of the graft charge as a low moisture content powered mass at the bottom of the spray-drying apparatus. The residual moisture of the spray-dried product is then sufficiently low not to impede the subsequent implementation of step (4), that is, the incorporation and dispersion of the grafted charge into the organic phase of the composition. It is interesting to note that, actually, the conditions prevailing in spray-drying may be considered relatively mild (despite the relatively high temperature of the air) as compared to previously used standard drying conditions. Indeed, under spray-drying conditions, the time during which sensitive materials are subjected to heat is quite short which might explain the favorable results experienced with the present method. Thus, although under the spray-drying conditions used here, air temperature in the order of 160°–280° C. may be used, no significant decomposition of the grafted substituents nor loss of the reactivity of the reactive sites thereof (if any were present) has been observed. In this step, conventional air spray-drying equipment with subsequent cyclone separation of the humid hot air and the dried powder can be used. Suitable apparatus are, for instance, the "MINISPRAY" apparatus (Buchi, Flawil, Switzerland) and the "NIRO" apparatus (NIRO ATOMIZER CO, Denmark).

For effecting step (4), the grafted mineral particles obtained after step (3) are dispersed into the polymerizable organic phase mentioned heretofore. This dispersion is carried out by usual means which include homogenizing mills such as the HOMOREX OOHR, PRESTOMILL and ULTRA TURRAX already mentioned in connection with step (2), ball mills and planetary mills. A preferred mill is a mill using micro-balls (size 1–1.5 mm) (DYNO-MILL KDL-pilot, WAB, Basel, Switzerland).

The organic phase in which the grafted charge is incorporated includes most monomers and/or prepolymers and mixtures thereof capable of providing transparent or translucent coatings and known in the field. Of particular interest are the photopolymerizable monomers and mixtures of monomers generally known to photopolymerize and the photopolymerization of which is fast enough under usual conditions to be completed in a short time frame (i.e. with exposure times from about a few seconds to a few minutes) and the refractive index "n" of which is close to that of the grafted charge used. Examples of such monomers (olefinic and preferably acrylic) can be found in the following reference: UV Curing by S. Peter PAPPAS, Science & Technology, Technology Marketing Corp., USA (1978).

Among the monomers also usable in the present method, are olefinic prepolymers with a photopolymerizable functionability and possessing, at the start, a significant intrinsic viscosity. A significant intrinsic viscosity is valuable for achieving compositions of mixtures of monomers and prepolymers of suitable viscosity. In general low molecular weight monomers decrease the viscosity of the composition but too high a proportion of such low molecular weight monomers can lead to surface tensions in the films during curing. Such tensions can be reduced by increasing the proportion of higher molecular weight prepolymers. Such prepolymers are known in practice most often under generic commercial names such as UVITHANE (Thiokol Corp), EBECRYL (Union Chimique Belge), UCAR-X (Union Carbide), SETAROL (Kunstharfabrik Synthese NV, Holland), ACTILANE (S.N.P.E.), GALGARD (Gulf Corp), CHEMLINK (Arco Chem). The structure of such prepolymers which fit well in the invention, provided they have the proper refraction indexes, are generally not disclosed publicly except for the fact that they are mainly polyester acrylates and polyurethane acrylates. In practicing the invention, one should use either monomers the "n" index of which is intrinsically close or substantially similar to that of the mineral filler used or, and this is the most frequent case, mixtures of photopolymerizable monomers and/or prepolymers the mixture index of which comes as near as possible to that of said mineral filler. By suitably varying the proportions of the two or more monomeric constituents the respective indexes of which are above and below the desired value, the latter can be approximated close enough for eventually obtaining, with the composition according to the invention, a practically transparent protective film with silica or alumina contents in the range of 10% by weight and up to 40% by weight or more. In step (4) of this invention polymerization catalysts and other additives for various purposes such as stabilizers, initiators, fungicides, anti-discoloring agents and the like can be added.

BRIEF DESCRIPTION OF THE DRAWING

The present method will be still better understood with reference to the accompanying drawing.

Figure 1:
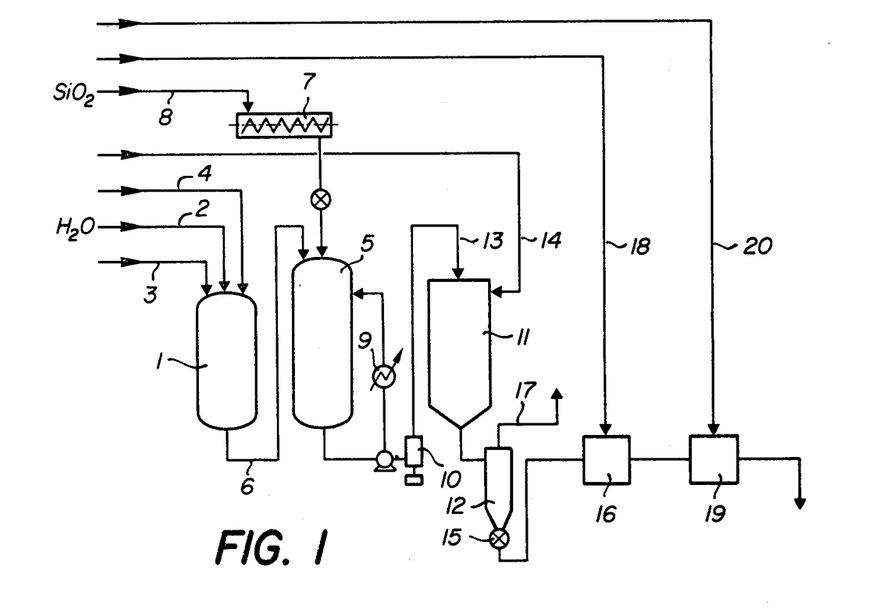
FIG. 1 represents diagrammatically an installation for carrying out, successively, steps 1 to 4.

The present installation comprises a first reactor 1 supplied with water, acid for adjusting the pH of the medium and the alkoxysilane reagent from lines 2, 3 and 4 respectively. After the hydrolysis of step (1) has been performed, the solution or dispersion of the hydrolyzed alkoxysilane is transferred into a second reactor 5 of the installation from a line 6, this reactor being fed with the mineral charge to be organophilized from a measuring feed hopper 7 connected to a supply line 8. The mineral charge and the hydrolyzed reagent are then vigorously mixed and homogenized in reactor 5 (step 2) whereby the mixture is recirculated into a cooling device 9 for maintaining the temperature within the prescribed limits in case the heat of mixing would raise the temperature unacceptably. After step (2) has been accomplished, the mixture is pumped with a pump 10 from the reactor 5 and transferred at a well determined rate into the spray-drying apparatus (step 3) consisting of an "atomizer" 11 followed by a cyclone 12.

In the atomizer 11, the arriving liquid (see arrow 13) is atomized or reduced a spray-like aerosol (step 3) by conventional liquid atomization means is a hot air current arriving sidewise into the atomizer and represented schematically by line 14. Then, the hot humid air (from evaporation of the mixture) containing in suspension the powdered spray dried material is sent to the cyclone wherein, according to means known in the art, it is subjected to a turbulent action along the walls of the cyclone whereby separation of the powder from the humid air occurs. The grafted mineral powder then accumulates to the bottom of the cyclone wherefrom it can be removed through a valve 15 and sent to a first mixer 16 while the humid gases escape by line 17 into the aspirator.

The mixture 16 serves to carry out a first part of step (4) by mixing the grafted charge issued from cyclone 15 with a suitable organic phase brought in through supply line 18. Then, the mixture of the mineral charge and the organic monomer(s) is sent to a second mixer 19 in which mixing with the additives arriving by line 20 is effected. If desired, mixer 19 can be omitted, the mixing with the additives being done in mixer 16.

The examples that follow will illustrate in further detail the practical aspects of the invention.

EXAMPLE 1

Twenty g of γ-methacryloxypropyl-trimethoxysilane (γ-MPS) were stirred at 25° C. (thermostat controlled temperature) with 480 g of water at pH 5.2 (acetic acid). After 1.25 hours with whitish emulsion disappeared, the solution became clear which indicated that hydrolysis had occurred. The solution was transferred into a one liter homogenizer ("PRESTO-MILL", 750 W. O. KRIEGER, Muttenz, Switzerland) into which 40 g of silica (type AEROSIL A-380) were also added. The dispersion step (2) was carried out for 15 minutes at 18.5° C. after which the mixture was spray dried using a "MINISPRAY HO N-58" (from BUCHI, Flawil, Switzerland), apparatus under the following conditions: temperature of spraying enclosure (see numeral 11 in the figure) 83°–86° C.; drying air temperature (numeral 14) 160° C.; flow rate (see pump 10) 600 ml/hr.

Twenty g of the grafted powder obtained in this way were mixed with 80 g of a 2:1 by weight mixture of diethylene glycol diacrylate and EBECRYL 220 (UNION CHEMIQUE BELGE) in a "PULERISETTE" planetary mill (FRITSCH CO, Germany) for 2 hours. The it was filtered on a wire mesh (40 micrometer mesh size). The absorbance at 500 nm of this composition and its viscosity at room temperature were 0.164 and 342±30 cP, respectively. The composition was then mixed with a photoinitiator as disclosed in detail in PCT/EP82/00004 and films of the composition were applied on a substrate and irradiated also as disclosed in the PCT reference. The cured films obtained had good abrasion-resisting properties.

The present example was repeated twice using in step (1) solutions with a pH of 4.25 and 3.6, respectively. In such cases the hydrolysis periods under identical conditions were ¾ hour and ¼ hour, respectively; the end properties of the compositions obtained using the hydrolyzed reagent and then proceeding exactly as described above were not significantly different.

EXAMPLE 2

Experiments identical with those reported under Example 1 were carried out using the same reagents, pH of hydrolysis 3.6 and all other parameters being the same as in Example 1 except for the hydrolysis period in step (1) which was varied from ½ hour to 15½ hours. Results, in terms of viscosities of coating compositions prepared exactly as disclosed in Example 1 and corresponding optical absorbances ($\log_{10} 1/T$), are shown below and indicate that no significant differences were experienced. (The "Encyclopedia of Physics" definition of "absorbance" is: Absorbence = $-\log_{10}$ of the ratio of the incident to the transmitted light intensities.)

| Test No. | Hydrolysis time (hrs) | Viscosity (cP) | Absorbance at 500 nm |
|---|---|---|---|
| 1 | 0.5 | 335 | 0.203 |
| 2 | 1 | 325 | 0.183 |
| 3 | 2 | 325 | 0.185 |
| 4 | 3 | 335 | 0.164 |
| 5 | 4 | 355 | 0.248 |
| 6 | 7 | 350 | 0.255 |
| 7 | 15 | 330 | 0.238 |
| 8 | 15.5 | 330 | 0.218 |

EXAMPLE 3

Three experiments similar to those described in Examples 1 and 2 were performed according to the following conditions:

Step 1: as in Example 2, hydrolysis time ½ hour.

Steps 2 to 4: as in Examples 1 and 2 at room temperature. In the first experiment, step 2 was carried out using an ordinary magnetic stirrer. In the two other experiments homogenizers with high dispersive capacity (PRESTO MILL and HOMOREX) were used. In the case of using the HOMOREX apparatus, no external cooling was used and the temperature rose by itself to 35° C. due to the heat of mixing: in the case of the PRESTO MILL, external temperature control (18° C.) was exercised. The results, again expressed in terms of the viscosities of the resulting compositions and transparency, are given below and show that use of powerful homogenizers rotating at high speed ($4-10 \times 10^3$ rpm) is advantageous in step 2.

| Experiment No. | Agitator | Viscosity Mineral charge in hydrolysis reagent (cP) | Viscosity Organic coating composition (cP) | Absorbance at 500 nm |
|---|---|---|---|---|
| 1 | magnetic | 7.6 (35° C.) | 340 | 0.246 |
| 2 | PRESTO MILL | 7 (18° C.) | 330 | 0.164 |
| 3 | HOMOREX (750W) | 50 (35° C.) | 300 | 0.135 |

EXAMPLE 4

Another series of experiments were performed as in the previous Examples, the only variations being the concentration of γ-MPS used in step 1. This concentration was varied from 1.14 weight percent to 8.0 weight percent so as to vary the weight ratio $SiO_2$ to alkoxysilane from 1:1 to 7:1. Step 2) was carried out in a PRESTO MILL homogenizer at 18.5° C. All other parameters were as in the previous Examples. The results are shown below still in terms of viscosity of the final coating composition and its transparency. It should however be remarked that the actual weight ratio of mineral material to organic material is not a constant along this series of experiments since the higher the grafting level (or rather the higher the amount of silane used in the grafting reaction), the lower the effective mineral to organic ratio in the composition since the weight of the organic grafted substituents must be taken into account.

| A | B | C | D | E | F |
|---|---|---|---|---|---|
| 1 | 8 | 1.0 | 9.86 | 175 ± 15 | — |
| 2 | 4 | 2.0 | 13.90 | 290 ± 30 | 0.085 |
| 3 | 3.2 | 2.5 | 14.50 | 324 ± 30 | 0.089 |

-continued

| A | B | C | D | E | F |
|---|---|---|---|---|---|
| 4 | 2.91 | 2.75 | 14.70 | 320 ± 40 | 0.084 |
| 5 | 2.66 | 3.0 | 14.98 | 380 ± 30 | 0.094 |
| 6 | 2.0 | 4.0 | 15.60 | 400 ± 30 | 0.126 |
| 7 | 1.6 | 5.0 | 16.17 | 400 ± 30 | — |
| 8 | 1.45 | 5.5 | 16.53 | 1240 ± 100 | — |
| 9 | 1.33 | 6.0 | 16.71 | Thixotr. | — |
| 10 | 1.23 | 6.5 | 16.75 | " | — |
| 11 | 1.14 | 7.0 | 16.87 | " | — |

A: Experiment No.
B: Concentration of silane in step (1) (% by weight).
C: Weight ratio of $SiO_2$ to silane.
D: Effective concentration of $SiO_2$ in the coating composition (% by weight).
E: Viscosity of the coating composition (cP).
D: Absorbance at 500 nm (log 1/T).

The above results show that grafting ratios expressed as weight of $SiO_2$ to weight of grafting alkoxysilane should preferably not exceed 6 for avoiding rheological problems with the final composition (Thixotropy).

EXAMPLE 5

In another series of experiments 120 g of γ-MPS were hydrolyzed for 2 hours at 23° C. and pH 3.6 in water, the total of the solution being 3 liters. Then step 2 was carried out with 240 g of $SiO_2$ (AEROSIL 380) for 15 minutes in the PRESTO MILL homogenizer at 18.5° C. After homogenization, the dispersion was kept for various periods under moderate agitation to check the stability before undertaking step 3. Steps 3 and 4 were carried out as in the previous example except for the temperature of the spray compartment which was 90°–95° C. The results below show that after about 5 hours storage under agitation the grafted aqueous dispersion undergoes strong viscosity increase (thixotropic behavior).

| Storage period (h) | Viscosity of aqueous grafted $SiO_2$ dispersion (cP) | Viscosity of the final coating composition (cP) | Absorbance at 500 nm |
|---|---|---|---|
| 0 | 23.7 | 234–30 | 0.142 |
| 2.5 | 509 | 277–30 | 0.159 |
| 4.5 | 768 | 289–30 | 0.125 |
| 22 | thixotropic | 335–35 | 0.116 |

EXAMPLE 6

In another series of experiments very similar to the previous Examples the variable parameter was related to the type of charge used (various kinds of silicas and aluminas).

Step 1 was carried out with 10 g of γ-MPS in 500 ml of water for 20 minutes at 25° C., pH 3.6.

Step 2 was carried out as in the previous Examples with 40 g of mineral charge for 20 minutes at 18.5° C. in the PRESTO MILL and steps 3 and 4 were performed exactly as in the previous Examples.

The results gathered below show that a relation exists between the surface per gram of the mineral particles and the viscosity of the final reference coating composition. Thus, for low viscosities, mineral charges with high specific surfaces are preferable. Other data on the charges used in this Example can be found in the reference PCT application.

| Filler (mineral charge) | Specific surface BET ($m^2/g$) | Viscosity of the final coating composition (cP) | Absorbance at 500 nm |
|---|---|---|---|
| A 380 ($SiO_2$) | 390 ± 40 | 370 ± 30 | 0.201 |
| A 300 ($SiO_2$) | 300 ± 30 | 430 ± 40 | 0.152 |
| A 200 ($SiO_2$) | 200 ± 25 | 630 ± 50 | 0.218 |
| A 130 ($SiO_2$) | 130 ± 25 | 570 ± 30 | 0.116 |
| EH 5 ($SiO_2$) | 390 ± 40 | 360 ± 30 | 0.143 |
| H 5 ($SiO_2$) | 325 ± 25 | 543 ± 60 | 0.106 |
| M 5 ($SiO_2$) | 200 ± 25 | 710 ± 80 | 0.119 |
| OK 412 ($SiO_2$) | — | — | — |
| TK 100 ($SiO_2$) | — | — | — |
| Hisil 215 ($SiO_2$) | 150 – (?) | 480 ± 140 | 1.520 |
| Hisil 233 ($SiO_2$) | — | 420 ± 80 | 1.278 |
| Gasil 200 ($SiO_2$) | — | 104 ± 15 | 0.956 |
| Alon (Cabot) ($Al_2O_3$) | — | 530 ± 250 | — |
| Alumina C (Degussa) | — | 450 ± 200 | — |

EXAMPLE 7

Experiments similar to those described in the previous Examples were performed, the variables being the parameters for the separation and drying of the grafted charge, i.e. step 3.

Steps 1 and 2 were carried out as previously described, that is:

Step 1: pH 3.5–3.6; ½ hour; 10 or 20 g of γ-MPS in 500 ml $H_2O$.

Step 2: 40 g of AEROSIL A-380; PRESTO MILL homogenizer; 20 minutes homogenization time at 20° C.

Step 3:

(a) Comparative, using either (a1) a vacuum oven type "HERAEUS", 110° C., 15 Torr for 24 hours, or (a2) a "ROTOVAPOR" (BUCHI), 80° C., 140 Torr, 20 hours. In both comparative cases, the charges were milled in a "WARING BLENDOR" after separation and post-dried at 110° C./15 Torr for 2 hours.

(b) Test; (b1) using a "MINI SPRAY HO" laboratory sprayer operating under the following conditions: air temperature 160° C.; spraying enclosure temperature 83°–86° C. or 70° to 100° C.; rate 600 ml/hour. No subsequent milling of the charge was effected.

(b2) using a "NIRO" type spray drier; conditions: evaporating air temperature from 196°–201° C. to 260°–270° C.; pump pressure 4 kg/$cm^2$; spraying enclosure between 60° and 110° C.; rate (in terms of dry sprayed charge) 36 to 383 g/h.

Step 4 was carried out as previously described.

The results of the tests and comparative experiments showed that approximately similar properties (in term of final composition viscosity) were obtained for the (a) and (b1) tests (at 83°–86° C.) with the proviso that in the comparative (a) tests, careful milling of the dry grafted charge was necessary before carrying out step 4.

The data below concern the tests referred to as (b2) above. They show the influence of the enclosure temperature on viscosity and "transparency" (the inverse of the given absorbance) of the final composition as in the previous test for two drying air temperatures.

Figure 2:
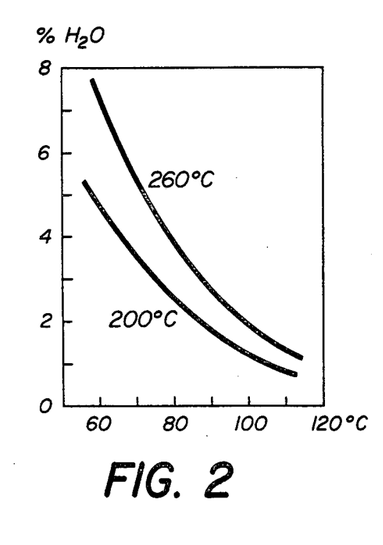
FIG. 2 is a graph showing the influence of temperature on the level of moisture of the spray dried product.
Figure 3:
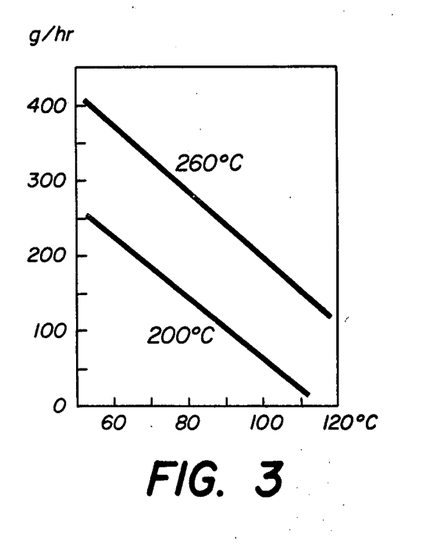
FIG. 3 is a graph showing the relation between spray-enclosure temperature and spray-drying rate (in terms of time yield of dry product).

Further, the graphs of FIGS. 2 and 3 show the influence of such temperature on the rate of spray drying and humidity of the dried product.

| Experiment No. | Hot air (T °C.) | Spraying room (T °C.) | Absorbance (500 nm) | Humidity (%) | Viscosity (cP) |
|---|---|---|---|---|---|
| 1 | 260–270 | 110 | 0.203 | 1.39 | 420–40 |
| 2 | 260–270 | 100 | 0.185 | 1.58 | 415–40 |
| 3 | 260–270 | 90 | 0.162 | 2.74 | 355–35 |
| 4 | 260–270 | 80 | 0.168 | 4.99 | — |
| 5 | 260–270 | 70 | 0.152 | 5.48 | 320–30 |
| 6 | 260–270 | 60 | 0.137 | 7.48 | 280–30 |
| 7 | 196–198 | 60 | 0.135 | 4.66 | 325–30 |
| 8 | 196–198 | 70 | 0.124 | 3.39 | 395–40 |
| 9 | 196–199 | 80 | 0.555 | 2.61 | 480–40 |
| 10 | 197–199 | 90 | 0.168 | 1.96 | 595–40 |
| 11 | 199–201 | 100 | 0.168 | 1.85 | 580–40 |
| 12 | 200–201 | 110 | — | 0.91 | — |

Absorbance, refractive index and viscosity are measured at 20% of charge in the standard organic resin.

From the data of the above table and the graphs of FIGS. 2 and 3, it becomes clear that the temperature of both the drying air and the spraying room has an influence on the spray-drying rate and the residual moisture of the pulverized product. For a same temperature of the spraying room, the drying rate is higher at 260° C. than at 200° C. The residual moisture is however higher at 260° C. than at 200° C. since at the lower temperature, the material remains longer in the enclosure than at the higher temperature. Further, the importance of the enclosure temperature is the following: the lower the temperature, the higher the drying rate and the residual moisture level.

The viscosity and the absorbance of the standard control composition (20% by weight of grafted silicon for 80% of organic phase) decrease together with the temperature in the spraying enclosure. This results from the increase in humidity of the charge and therefore from the actual decrease in the effective weight of silica introduced into the organic phase. This can be evidenced by bringing about the complete dehydration (in a vacuum oven) of the spray dried silica before its incorporation into the resin. Thus the preferred spray drying conditions should be selected as a compromise between a high spraying rate (favorable time yield) and a low moisture level. With the NIRO apparatus, such conditions are about 260°–270° C. for the drying air and 80°–90° C. for the spraying enclosure.

EXAMPLE 8

A charge of grafted silica (AEROSIL-380) was prepared according to the conditions of the previous examples. The pertinent data are as follows: Step 1: 4% by weight of γ-MPS in water; 30 minutes hydrolysis at 25° C., pH 3.6. Step 2: 40 g of silica for 500 ml of the aqueous hydrolyzed silane solution, 20 minutes grafting time in the PRESTO MILL apparatus at 20° C. Step 3: spray drying with the NIRO apparatus, drying air 260°–270° C., enclosure 80°–90° C., pump pressure 4 kg/cm$^2$; rate about 230 g/hr.

The obtained charge was distributed in the proportion of 20% by weight in the aforementioned standard testing organic phase, the variables tested being the milling technique and the milling time.

After milling, the resulting compositions were passed through different mesh sieves, the quality criteria being fineness of particles filterability and low viscosity.

For the milling operation, the following technique and apparatus were used: the "HOMOREX", "ULTRATURRAX" and "PRESTOMILL" homogenizers already mentioned heretofore. The milling technique of these involve extensive stirring effects; no balls are used in such homogenizers.

A cylindrical ball mill. This consists of a horizontally rotating jar containing glass balls. The size of the balls is about 1 cm or more. Smaller balls are not appropriate as they are not heavy enough to properly tumble in viscous media.

A planetary ball mill "PULVERISETTE". This mill comprises symmetrically placed containers which simultaneously rotate in the vertical and in the horizontal plane. The containers also enclose balls of about 1 cm or more.

A micro-ball mill. This mill can be a cylindrical container equipped with a stirrer and filled with very small glass beads (size in the order of 1–2 mm or less). The beads are forced into agitation by the stirrer. The weight ratio of viscous composition to the beads is relatively small.

A "DYNO-MILL". This is a continuous type mill in which a mixture of composition and micro-balls (beads) is continuously circulated in a rotating stirred enclosure.

The milling conditions and results are summarized below:

| Mill | Milling time (hrs) | Viscosity (cP) | Filterability mesh size (um) | | | Aggregate size (um) |
|---|---|---|---|---|---|---|
| | | | 50 | 27 | 10 | |
| HOMOREX | 0.25 | 240–290 | no | no | no | 25 |
| ULTRA TURRAX | 0.50 | 250–280 | no | no | no | 25 |
| PRESTO-MILL | 0.50 | 230–280 | no | no | no | 25 |
| Cylindrical ball-mill | 24 | 300–330 | no | no | no | 25 |
| PULVERISETTE | 3 | 390–420 | yes | yes | no | 20–25 |
| HOMOREX + Microball mill | 0.25 5 | 410–420 | yes | yes | yes | 3–5 |
| ULTRA TURRAX + DYNO-MILL | 0.5 2 passes | 410–430 | yes | yes | yes | 1–3 |

The best results were obtained after milling with the micro-balls having 1–1.5 mm diameter (DYNO-MILL); the weight ratio bead/liquid was about 1:1 to 10:1, preferably 5:1; the stirring velocity was about 10 m/sec; the temperature raised from about 20° C. to about 30° C. during milling.

We claim:

1. A process for producing a mineral charge of finely divided silica or alumina having organophilic substituents comprising:
   (a) hydrolyzing in a hydrolysis medium a di- or trialkoxysilane of formula $$(RO)_{3-n}SiR^I{}_n r^2 \tag{I}$$

in which R represents identical or different lower alkyls and $R^1$ and $R^2$ are identical or different and selected from the group consisting of alkyl, cycloalkyl, alkylated cycloalkyl, amino alkyl, alkyl amine, alkoxy, alkoxy alkyl, epoxy alkyl, epoxy cycloalkyl, alkenyl, glycidoxy, acryloxy alkyl, methacryloxy alkyl, gamma-ureidopropyl, gamma-chloropropyl, gamma-mercaptopropyl groups, n being 0 or 1, said hydrolysis providing a corresponding di- or trihydroxy silane of formula $$(HO)_{3-n}SiR^1R^2_n \qquad (II)$$

in solution in the hydrolysis medium;

(b) adding thereto a proportion of mineral particles of finely divided alumina or silica whereby compound II will react with said particles thus providing graft particles;

(c) homogenizing the resultant mixture so as to provide a homogeneous dispersion of said graft particles in said medium;

(d) spray-drying said homogeneous dispersion, thus forming a powdered substantially dry grafted mineral charge.

2. The method of claim 1, wherein step (a) is carried out in aqueous medium, the % by weight of compound of formula (1) being in the range from about 1 to 20% relative to the percent by weight of water.

3. The method of claim 2, wherein step (a) is carried out at a temperature of 10° to 50° C. under agitation for a period of 15 min to 15 hrs.

4. The method of claim 2, wherein $R^1$ is formulae I and II is a γ-methacryloxypropyl group and said aqueous medium has a pH between 3 and 5.5.

5. The method according to claim 1 wherein: step (a) is carried out in an aqueous medium; the percent by weight of alkoxysilane is 1 to 10% relative to the percent by weight of the water; the pH is maintained at 3.6; step (a) is carried out at a temperature between 15° through 25° inclusive under agitation and for 15 to 30 minutes; and $R_1$ is a γ-methacryloxypropyl group.

6. The method of claim 1, comprising using weight ratio of mineral charges to alkoxysilanes from 1:1 to 10:1.

7. The method of claim 6, wherein homogenizing is carried out for about 15 min. to 2 hrs. at temperatures of about 10° to 50° C.

8. The method of claim 6, which comprises homogenizing for 30 min. at room temperature.

9. The method of claim 1, comprising effecting said homogenizing at high stirring speed and under high shear conditions.

10. The method of claim 1, comprising effecting steps (a), (b) and (c) substantially simultaneously.

11. The method of claim 1, in which carrying out step (d) comprises injecting under pressure the aqueous dispersed charge resulting from step 2 into a current of hot air or gas within a spray-drying enclosure for effecting evaporation of said water and directing the resulting hot and wet air-charge mixture into a cyclone for separating said charge from said wet air.

12. The method of claim 11, wherein the temperature of said air is from about 160°–280° C. and the temperature of said enclosure is from 60° to 110° C.

13. The method of claim 12 wherein the temperature of said air is 260°–270° C. and that of said enclosure is 80°–90° C.

14. The method of claim 11, wherein said charge after separation from said wet air has a moisture content of 1 to 8%.

15. The method of claim 13, wherein said charge after separation from said hot air has a moisture content of about 2 to 4%.

16. The method of claim 1, wherein the step (e) the incorporation and milling of said dried charge into said organic phase is effected using, as a milling aid, glass beads of less than 2 mm diameter.

17. The claim according to claim 1 in which R is selected from the group of lower alkyls consisting of methyl, ethyl propyl, butyl, and pentyl.

18. The claim according to claim 17 in which R is a cycloalkyl.

* * * * *